United States Patent
Cheng et al.

(10) Patent No.: US 10,430,730 B2
(45) Date of Patent: Oct. 1, 2019

(54) DETERMINING DESCRIPTIVE ATTRIBUTES FOR LISTING LOCATIONS

(71) Applicant: Airbnb, Inc., San Francisco, CA (US)

(72) Inventors: Lu Cheng, San Francisco, CA (US); Surabhi Gupta, San Francisco, CA (US); Frank Lin, San Francisco, CA (US)

(73) Assignee: Airbnb, Inc., San Francisco, CA (US)

( * ) Notice: Subject to any disclaimer, the term of this patent is extended or adjusted under 35 U.S.C. 154(b) by 901 days.

(21) Appl. No.: 14/800,369

(22) Filed: Jul. 15, 2015

(65) Prior Publication Data

US 2016/0019474 A1   Jan. 21, 2016

Related U.S. Application Data

(60) Provisional application No. 62/025,397, filed on Jul. 16, 2014.

(51) Int. Cl.
*G06Q 10/02* (2012.01)
*G06Q 50/14* (2012.01)
*G06F 16/31* (2019.01)

(52) U.S. Cl.
CPC ......... *G06Q 10/02* (2013.01); *G06F 16/313* (2019.01); *G06Q 50/14* (2013.01)

(58) Field of Classification Search
CPC ...... G06F 17/30; G06F 7/10; G06F 17/30241; G06F 17/30616; G06F 17/2705; G06F 17/2854; G06F 16/285; G06F 16/951; G06F 17/28; G06F 17/2735; G06F 17/274; G06F 16/345; G06F 16/358; G06F 17/2785; G06F 17/2881; G06F 17/27; G06G 10/02; G06Q 10/02; G06Q 30/0217; G06Q 30/02; G06Q 50/01; G06Q 30/0203; G06Q 30/0201; G06Q 30/0245; G06Q 30/0601
(Continued)

(56) References Cited

U.S. PATENT DOCUMENTS

| | | | |
|---|---|---|---|
| 2010/0005083 A1* | 1/2010 | Morgana | G06F 17/30616 707/E17.008 |
| 2011/0264655 A1* | 10/2011 | Xiao | G06F 17/30616 707/728 |

OTHER PUBLICATIONS

Top sporting goods and outdoor retailers choose PowerReviews' high-impact, tag-based approach to online customer reviews. (Oct. 2, 2006). Business Wire Retrieved from https://dialog.proquest.com/professional/docview/671204300?accountid=142257 (Year: 2006).*

(Continued)

*Primary Examiner* — Michael P Harrington
(74) *Attorney, Agent, or Firm* — Fenwick & West LLP

(57) ABSTRACT

Listings and reviews of listings can be processed to identify descriptive attributes for locations associated with the listings. To do this, a corpus of words is generated for various locations based on listings in the locations and reviews of those listings. An expected frequency, and per-location frequency for each word is determined. These numbers are in turn used to determine a number of high frequency listing locations, and a number of below expected frequency listing locations for each word. Based on a comparison of the number of high frequency listing locations and the number of below expected frequency listing locations of a word with an attribute reference number, the word can be identified either as an attribute that is likely descriptive of the location, or not.

20 Claims, 5 Drawing Sheets

(58) Field of Classification Search
USPC .......................................................... 707/739
See application file for complete search history.

(56) References Cited

OTHER PUBLICATIONS

Natural language processing. Science, 253, p. 1242(8). Retrieved from https://dialog.proquest.com/professional/docview/767536171?accountid=142257 (Year: 1991).*
PCT International Search Report and Written Opinion, PCT Application No. PCT/US2015/040608, dated Nov. 19, 2015, 11 pages.

* cited by examiner

DETERMINING DESCRIPTIVE ATTRIBUTES FOR LISTING LOCATIONS

CROSS REFERENCE TO RELATED APPLICATIONS

This application claims the benefit of U.S. Provisional Application No. 62/025,397, Jul. 16, 2014, which is incorporated by reference in its entirety.

BACKGROUND

Travel booking systems often include functionality for providing travel locations to users. When programmatically providing travel locations to a user, it is important to present contextual and interesting content describing the locations such that the user is motivated to travel to the location. In some travel booking systems, such contextual and interesting content is identified using methods based on words that appear with high frequency in travel descriptions and reviews. While this technique surfaces terms that are popular in listings and, thus, may provide some contextual insights into the location, the terms are often too generic to the location and do not particularly describe attributes of the location that may be of most interest to a user to whom the location is being provided. For example, using the term 'apartment' and 'Muni' would appear from listings located in San Francisco since these terms are commonly used in listings and reviews of San Francisco locations. While these terms are descriptive of and associated with San Francisco, these terms do not identify attributes of San Francisco that would entice a prospective traveler to visit the city.

SUMMARY

Listings and reviews of listings can be processed to identify descriptive attributes for locations associated with the listings, where the listings describe goods or services and each listing is associated with a geographic location. To do this, a corpus of words is generated for based on listings in the locations and the reviews of those listings. For each word, an expected frequency, one or more per-location frequencies, a number of high frequency listing locations, a number of below expected frequency listing locations, and a descriptiveness metric are determined. For a given word, the number of high frequency listing locations is a number of locations where the per-location frequency of the word is a first multiple greater than the expected frequency for that word. Similarly, for a given word the number of below expected frequency listing locations is a number of locations where the per-location frequency of the word is a second multiple smaller than the expected frequency. The descriptiveness metric of a word is based on the number of high frequency listings locations and the number of low frequency listings locations for that word. By comparing the descriptiveness metrics of the words in the corpus and an attribute reference number, some of the words in the corpus can be labeled as "attributes," meaning they are interpreted to be descriptive of locations, such that if a user of the system was provided with a listing labeled with one or more of the attributes, the attributes would be meaningful to them in understand the characteristics of the location in which the listing is located.

BRIEF DESCRIPTION OF THE DRAWINGS

The invention has advantages and features which will be readily apparent from the following detailed description of the invention and the appended claims, when taken in conjunction with the accompanying drawings, in which:

DETAILED DESCRIPTION

System Overview

Figure 1:
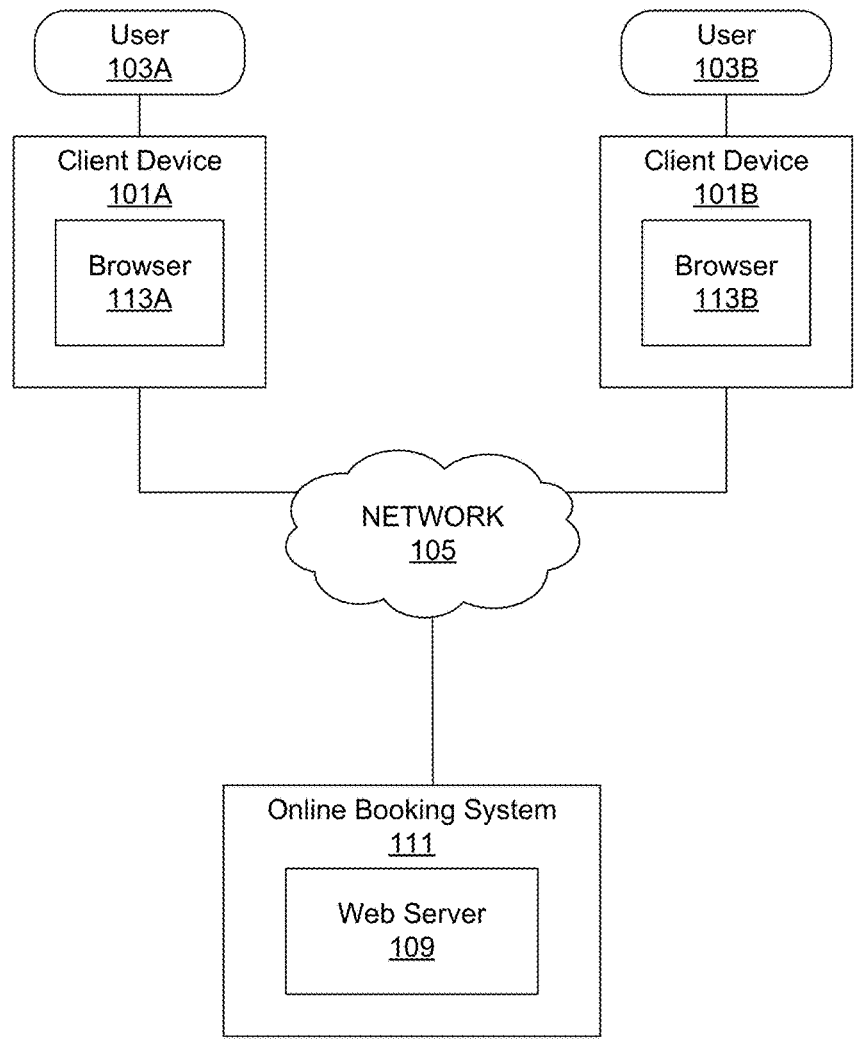
FIG. 1 is a block diagram of a computing environment, according to one embodiment.

FIG. 1 is a block diagram of a computing environment, according to one embodiment. FIG. 1 and the other figures use like reference numerals to identify like elements. A letter after a reference numeral, such as "113A," indicates that the text refers specifically to the element having that particular reference numeral. A reference numeral in the text without a following letter, such as "113," refers to any or all of the elements in the figures bearing that reference numeral (e.g. "113" in the text refers to reference numerals "113A" and/or "113B" in the figures).

The network 105 represents the communication pathways between users 103 (e.g., consumers) and the online booking system 111. In one embodiment, the network is the Internet. The network can also utilize dedicated or private communication links (e.g. wide area networks (WANs), metropolitan area networks (MANs), or local area networks (LANs)) that are not necessarily part of the Internet. The network uses standard communications technologies and/or protocols.

The client devices 101 are used by the users 103 for interacting with the online booking system 111. A client device 101 is a device that is or incorporates a computer such as a personal computer (PC), a desktop computer, a laptop computer, a notebook, a smartphone, or the like. A computer is a device having one or more processors, memory, storage, and networking components (either wired or wireless). The client device 101 executes an operating system, for example, a Microsoft Windows-compatible operating system (OS), Apple OS X or iOS, a Linux distribution, or Google's Android OS. In some embodiments, the client device 101 may use a web browser 113, such as Microsoft Internet Explorer, Mozilla Firefox, Google Chrome, Apple Safari and/or Opera, as an interface to interact with the online booking system 111. In other embodiments, the client device 101 may execute a dedicated application for accessing the online booking system 111. When executing either a browser 113 or a dedicated application to interface with the online booking system 111 the client device 101 is configured to and operates as a particular, special purpose device.

The online booking system 111 includes web server 109 that presents web pages or other web content that form the basic interface visible to the users 103. Users 103 use respective client devices 101 to access one or more web pages, and provide data to the online booking system 111 via the interface.

The online booking system 111 may be utilized, for example, as an accommodation reservation system, a dining reservation system, a rideshare reservation system, a retail system, and the like. More generally, the online booking system 111 provides users with access to an inventory of consumable resources (e.g. goods and services) that are available to consumers, where the resources are typically available only for a limited duration, and the real world, physical location of each resource is considered as a factor in the consumer's decision to consume (e.g., purchase, license, or otherwise obtain) the resource. Generally, resources available at some locations are more desirable than otherwise identical resources available at other locations. Resources include accommodations, restaurants, vehicles, attractions (e.g., shows, events, and tourist attractions), shopping centers and the like. For example, in an online booking system 111 that provides accommodations, accommodations in particular neighborhoods may be more or less desirable than otherwise identical accommodations in other neighborhoods: a given neighborhood may be considered more interesting, more prestigious, safer, or as having some other quality that consumers deem valuable when selecting accommodations.

In some embodiments, the online booking system 111 facilitates transactions between users 103. For example, an accommodation reservation system allows users 103 to book accommodations provided by other users of the accommodation reservation system. A rideshare reservation system allows users 103 to book rides from one location to another. An online market place system allows users 103 to buy and/or sell goods or services face to face with other users. The online booking system 111 comprises additional components and modules that are described below.

Online Booking System Overview

Figure 2:
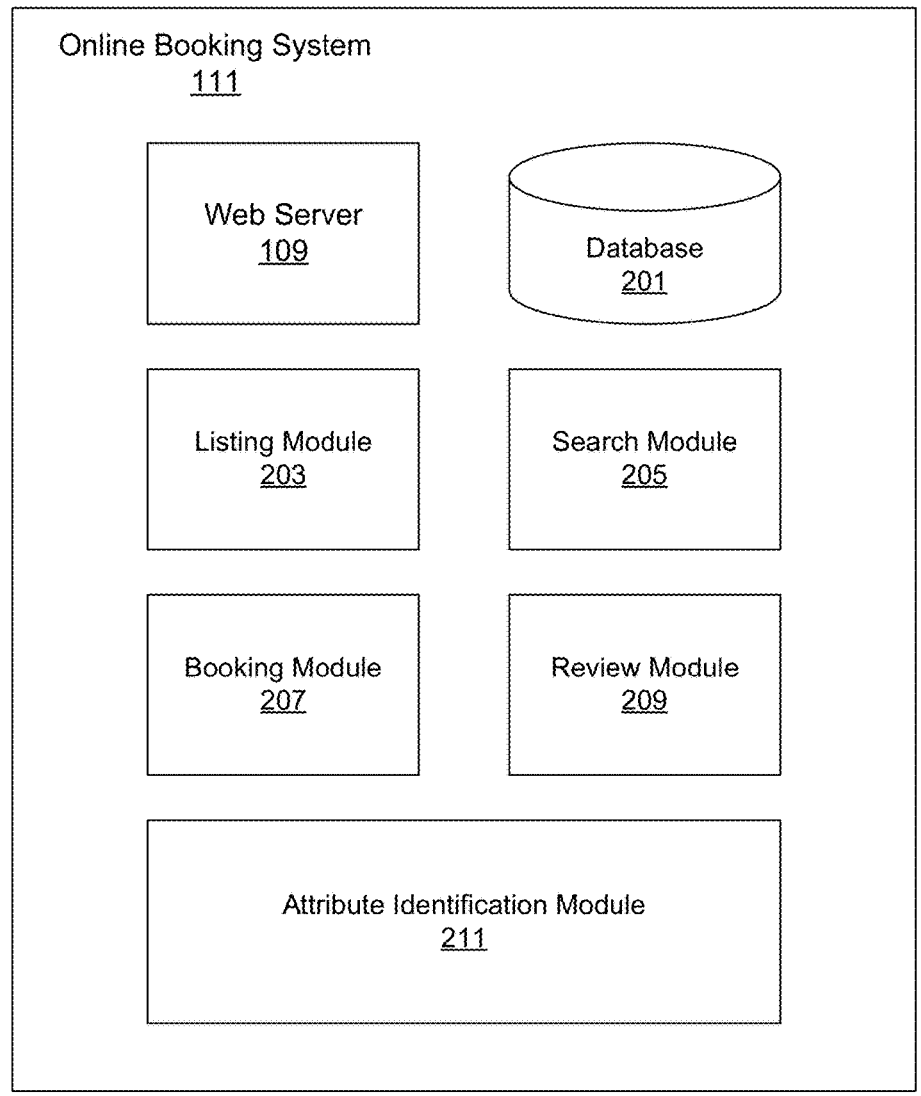
FIG. 2 is a block diagram of an online booking system browsing and booking listings having specific locations, according to one embodiment.

FIG. 2 is a block diagram of an online booking system browsing and booking listings having specific locations, according to one embodiment. The online booking system 111 includes a database 201, a listing module 203, a search module 205, a booking module 207, a review module 209, a location discovery module 211, and an attribute identification module 211.

Those of skill in the art will appreciate that the online booking system 111 will contain other modules appropriate for its functionality (e.g., social networking, banking, commerce, etc.), but that are not described herein, since they are not directly material to the invention. In addition, conventional elements, such as firewalls, authentication and encryption systems, network management tools, load balancers, and so forth are not shown as they are not material to the invention. The online booking system 111 may be implemented using a single computer, or a network of computers, including cloud-based computer implementations. The computers are preferably server class computers including one or more high-performance computer processors and main memory, and running an operating system such as LINUX or variants thereof. The operations of the system 111 as described herein can be controlled through either hardware or through computer programs installed in non-transitory computer storage and executed by the processors to perform the functions described herein. The database 201 is implemented using non-transitory computer readable storage devices, and suitable database management systems for data access and retrieval. The database 201 is implemented in a database management system, such as a relational database (e.g., MySQL). The online booking system 111 includes other hardware elements necessary for the operations described here, including network interfaces and protocols, input devices for data entry, and output devices for display, printing, or other presentations of data. As will become apparent below, the operations and functions of the online booking system 111 are sufficiently complex as to require their implementation on a computer system, and cannot be performed as a practical matter in the human mind. The database 201 maintains tables appropriate to the type of resources being offered, and the users of the system. Thus, in one embodiment for an accommodation reservation system, the database includes a host table (storing records for users who are hosts providing listings), a guest table (storing records of users who are guesting licensing listings from hosts), a listing table (storing records of available properties for license), a booking table (storing records of listing that have been licensed by a host to a guest), a transactions table (storing transaction information, such as payments), a messages table (storing records of messages between hosts and guest), a reviews table (storing records of reviews provided by hosts of guests, and of guests by hosts) and other administrative and management tables.

The listing module 203 provides a user interface and processing logic for users to list goods or services for purchase or license to other users, and is one means for doing so. For example, if the online booking system 111 is an accommodation reservation system, then the listing module 203 provides a user interface suitable for listing accommodations, such as houses, apartments, condominiums, rooms, treehouses, castles, tents, couches, and sleeping spaces, which information is stored in the listing table. If the online booking system 111 is a dining reservation system, then the listing module 203 provides a user interface for listing available reservations at restaurants, entertainment venues, resorts, etc. If the online booking system is a rideshare reservation system, then the listing module 203 provides a user interface for listing available rides.

The listing module 203 is configured to receive a listing from a user describing the good or service being offered, a time frame of its availability, a price, a location, and other relevant factors, and stores this information in the listing table. For example, for an accommodation reservation system, a listing in the listing table includes fields for a type of accommodation (e.g. house, apartment, room, sleeping space, other), a representation of its size (e.g., square footage, or number of rooms), the dates that the good or service is available, and a booking rate (e.g., per night, week, month, etc.). The listing module 203 allows the user to include additional information describing the good or service including photographs and other media. The location information for a listing provides specific reference to a physical location or area in the real world, and may include a country, state, city, and neighborhood of the listing, geographical coordinates, mailing addresses, or other suitable location specifying information. The listing module 203 is also capable of converting one type of location information (e.g., mailing address) into another type of location information (e.g., country, state, city, and neighborhood) using externally available geographical map information. Listings created using the listing user interface are processed by the online booking system 111 and stored in the database 201 in the listing table. The listings may further be organized by location, based on physical proximity to each other, to particular landmarks, to traditional types of listing boundaries (e.g., city, state, county, country), according to an externally defined organizational structure (e.g. neighborhood), etc.

In some online booking systems 111, some listings are temporary, are available for booking one time only, and/or are capable of being deleted by the listing user. The listing module 203 stores these historical, unavailable listings in database 201 in an historical listing table. The online booking system 111 uses these historical listings to analyze the behaviors of users in creating, searching, ranking, and booking listings. Historical listings may be encrypted or otherwise protected so that they are not available to anyone other than the operator of the booking system 111.

The booking module 207 provides a user interface and processing logic for users to view and book listings created by other users. The booking module 207 receives payment information from booking users, and securely transmits the payments to listing users. Any user information transmitted as part of the purchase processed is encrypted for user privacy and protection. Bookings are stored in the booking table. Upon completion of a booking, the booking is encrypted and stored as historical booking information in database 201 in the booking table or in a separate historical booking table.

The review module 209 provides a user interface and processing logic to receive reviews of the listings offered by other users, providing evaluations, feedback, and other commentary about a listing, and is one means for doing so. Completed reviews be included within and appear alongside listings, so that future users interested in booking the listing can evaluate the listing with the reviews in mind. Reviews are stored in association with their associated listings in the database 201 in the reviews table. Similar to historical listings, reviews for historical listings may continue to be stored in database 201 after the listing is no longer available in either the reviews table or a separate historical reviews table.

The search module 205 provides a user interface and processing logic for searching the database for listings responsive to a search query, and is one means for doing so. The user interface of the search module 205 is configured to receive a search query specifying various attributes of a desired good or service, such as type, location, price, and so forth. The search module receives the user specific attributes, and constructs a database query (e.g., a query in SQL or other database query language). The database query matches the attributes of the search query to listings in the listing table in database 201. The matched listings are then ranked using the ranking module 211. The search query module then provides the ranked set of listings to a client device, so that the user of the client device can access the listings in a convenient manner. The user interface of the search module 205 is capable of displaying the ranked set of listings by rank order.

Depending upon the implementation, the user interface for receiving a search query may be simple, allowing for as little as a single text string to be entered as the search query, or it may allow for multiple different kinds of predetermined and/or dynamic input options to be entered in the search query. The user interface provides for specification of a location for inclusion in the search query. The location may be auto-populated with the current location of the client device 101A the user is using to perform the search. Alternatively, the user may manually enter a location in the search query. These may include specification of a country, state (or another regional equivalent such as a province, region, territory, canton, department, county, district, or prefecture), city, neighborhood, or other designation such as geographical coordinates (e.g., longitude, latitude), a street address, and a zip code.

In some scenarios, a user of the online booking system 111 is looking to discover new and interesting locations for travel and, thus the search query provided by the user may be non-specific in terms of a location, but instead descriptive of attributes that the user is interested in. For example, instead of searching by location name (e.g., a search for "Lake Tahoe") the user may search for "beach" "sunsets" or "water skiing," since these are the attribute of interest to the user. The search module 205 identifies locations that may be of interest based on the input attributes to the user and displays the locations to the user in the user interface. In some embodiments, the search module 205 displays the locations in the user interface before the user provides any search query. To entice the user to explore listings, the display of each location includes relevant and interesting attributes about the location.

Location Attribute Identification

The attribute identification module 211 processes listings in the listing table and reviews in the reviews table to programmatically identify attributes descriptive of the listing locations, and is one means for doing so. Specifically, the attribute identification module 211 generates a collection of words that appear in the listings and reviews stored in the database 201 tables. The collection of unique words is referred to herein as the "corpus." A word is "unique" simply in the sense that it appears once in the corpus. Each word in the corpus has related metadata, including frequency information that indicates how frequently the word appears in listings and reviews. The frequency information can be raw counts, or normalized values.

For each word in the corpus, the attribute identification module 211 computes a descriptiveness metric that indicates how well the word describes one or more attributes of locations that are meaningfully descriptive and would be of interest to a prospective visitor to a location. The attribute identification module 211 then determines, for each location having a listing in the database 201, a set of attributes based on words in the corpus that have a descriptiveness metric above a threshold. These will be the words that are deemed to be most descriptive of the location. For example, for each geographic location, such as Los Angeles, Chicago, San Francisco, Paris, Las Vegas, the attribute identification module 211 outputs a set of words (e.g., 10 or 20 words) that are deemed to be most descriptive of that specific location.

In operation, to generate the corpus, the attribute identification module 211 retrieves every listing and every review of a listing from the database 201 (or a target subset thereof) and extracts the words that appear in the textual descriptions of the listings and the reviews. In one embodiment, this initial list is filtered to remove stop words (e.g., prepositions, articles, etc.) to form the corpus. The list is processed to determine each unique word. For each unique word in the corpus, the attribute identification module 211 computes an expected frequency based on the number of times the word appears in the corpus and the total number of words in the corpus. In one embodiment, the attribute identification module 211 computes the expected frequency of a word using the following formula:

$$f(x) = \frac{N_x}{N_t}$$

where f(x) is the expected frequency of word x, $N_x$ is the total number of times word x appears in the corpus, and $N_t$ is the total number of words in the corpus.

In some embodiments, prior to computing the expected frequency, the attribute identification module 211 processes the corpus to filter out words that may introduce bias. For example, to avoid bias introduced by proper nouns, the attribute identification module 211 remove words from the corpus that appear as proper nouns. For example, "Sunset Boulevard "Hayes Valley," and other proper nouns, such as place names are removed. In one embodiment, the proper nouns are identified using a part-of-speech-tagging (POST) technique. In another embodiment, the proper nouns are identified by matching words and bigram and trigram phrases against curated lists of proper names (e.g., WordNet, or Wikipedia). Also, when computing the expected frequency, the attribute identification module 211 does not count words that appear in bigrams and trigrams as individual words, but does maintain frequency counts for the bigrams or trigrams themselves. For example, the bigram "jet skiing" is counted, but it does not affect the count of the underlying unigrams, and therefore the expected frequency, of the individual words "jet" or "skiing." These bigrams and trigrams may be identified using an external resource, such as Wikipedia.

Further, when computing the expected frequency, the attribute identification module 211 identifies words that often co-occur in the listings and reviews for a given location. For example, "winery" and "vineyards" co-occur across listings in Napa. Thus, for each location, the attribute identification module 211 maintains a co-occurrence matrix that stores the frequency of co-occurrences of words appearing in listings and reviews for that location. Where a pair of words have a significant measure of mutual information, the attribute identification module 211 counts the occurrence of each word in the pair towards the frequency count of the other word. For example, an occurrence of "vineyard" will count towards the frequency count of "winery" and vice versa. In such a manner, words that identify or describe the same attribute are grouped together.

To compute the descriptiveness metric of each unique word in the corpus, the attribute identification module 211 first determines a per-location frequency of the word. For each location for which listings are offered, the module 211 stores a location list of the unique words from the corpus that appears in listings and reviews for the location, along with a per location frequency. Thus, a location list of words is stored for example, for San Francisco, Los Angeles, and so on. The per-location frequency of a given word in a location list indicates the number of times the word appears in listings and reviews of listings for that location.

Once the location lists completed, they can be processed by iterating over each word to determine the frequency of that word in each location. Some words will have high frequency in a large number of locations. For example "restaurant" or "bars" or "parks" will be found in listings and review of many different locations. Other words will have high frequency, but only in a small number of locations. These are words that are highly descriptive of particular locations. For example, "beach" would be very commonly used to in descriptions of Los Angeles or San Diego, but would rarely appear in descriptions of Paris or London or Seattle. Still other words will have a low frequency, and appear in relatively few locations. These would be words that may be particular of specific locations, but otherwise not commonly used. Thus, for each word in the location lists, the attribute identification module 211 then determines the number of locations that have a per-location frequency that is higher than a predetermined multiple of the expected frequency for that word. This number of locations is referred to herein as the "number of high frequency listing locations." For example, the high frequency listing locations for a given word are those in which the word appears more the 4 times the expected frequency. More specifically, for example, if the expected frequency of the word "bridge" is 0.025 (i.e., the word appears 25 times per thousand words), then a high frequency listing location would have the word "bridge" appearing with a frequency of 0.100 (100 times per thousand).

Similarly, the attribute identification module 112 also determines the number of locations that have a per-location frequency that is less than a different and smaller multiple of the expected frequency of the word. This number of locations is referred to herein as the "number of below expected frequency listing locations." For example, the below expected frequency listing locations for a given word are those in which the word appears less than 0.4 times the expected frequency. In some embodiments, the multiple values (e.g., 4 and 0.4) are reciprocals, but in other embodiment they need not be. The attribute identification module 211 computes the descriptiveness metric based on a ratio of the number of high frequency listing locations and the number of below expected frequency listing locations. In one embodiment, the attribute identification module 211 computes the descriptiveness metric for a word using the following formula:

$$D_x = \frac{N_{h(x)}}{N_{l(x)}}$$

where $D_x$ is the descriptiveness metric of the word, $N_{h(x)}$ is the number of high frequency listing locations for the word, and $N_{l(x)}$ number of below expected frequency listing locations for the word. When the number of high frequency listing locations and the number of below expected frequency listing locations are similar in value, the value of the descriptiveness metric approaches 1 and indicates that the word appears both very frequently or very infrequently in a large number of locations. This information is valuable as it is a measure of the uniqueness of a word to a location. Words having a descriptiveness metric approaching 1 (e.g., $0.85<D_x<1$) (herein referred to as the "attribute reference number") are deemed as attributes and can be used to meaningfully describe locations. Thus, for each location, the descriptive metric for each word in the location list can be computed, and the N (e.g., 20) words with a metric value closest to 1 can be obtained and ranked (e.g., based on actual frequency of usage for the location). This creates a list of words for each location that are highly descriptive of the location.

As an example, assume the word 'beach' appears significantly more frequently in listings and reviews of listings in locations that are in close proximity to a beach than in listings and reviews of listings in locations are not in close proximity to a beach. Therefore, the number of high frequency listing locations is likely to be greater than 1,000 (i.e., an example number of locations where there are beaches) and the number of below expected frequency listing locations is likely to also be greater than a 1000 (e.g., the number of locations where there are no beaches). Computing a descriptiveness metric for the word 'beach' based on these numbers of high and below expected frequency listing locations provides a descriptiveness metric having a value that approaches 1. The word 'beach,' therefore, is determined to be an attribute that is meaningfully descriptive of a location that is in close proximity to a beach. This determination is likely consistent with a visitor's interests when visiting such a location.

In some cases, the number of high frequency listing locations and the number of below expected frequency listing locations are below and above a first and a second threshold, respectively, resulting in a descriptiveness metric that is much less than 1. In these cases, the word is filtered out automatically. For example, assume that the word 'Muni' appears significantly more in listings and reviews of listings located in San Francisco but does not appear in listings and reviews of listings in other locations. Therefore, the number of high frequency listing locations is likely 1, i.e., San Francisco—the location of the Muni public transportation system, and the number of below expected frequency listing locations is likely very high, since most if not all other locations do not have a public transportation system named 'Muni'. Here, 1 is below the first threshold for a number of high frequency listing locations, and the number of below expected frequency listing locations is likely above the second threshold. As a consequence, the word 'Muni' is determined to be an attribute that is not meaningfully descriptive of San Francisco. This determination is likely consistent with a visitor's interests when visiting San Francisco—the visitor is likely to be more interested in 'waterfront' or 'crabs' than 'Muni.'

In other cases, the number of high frequency listing locations and the number of below expected frequency listing locations are above and below a third and a fourth threshold, respectively, resulting in a descriptiveness metric that is much more than 1. In these cases, the word is also filtered out automatically. For example, the word 'bar' appears in many listings located in many different locations. This is expected as bars are commonplace. As a result, the number of high frequency listing locations is likely very high, and the number of below expected frequency listing locations is likely very low, as most locations will have listing or reviews that mention that a location has bars. As a consequence, the word 'bar' is determined to be an attribute that is not meaningfully descriptive of any particular location.

Once the descriptiveness metric for each unique word in the corpus is computed, the attribute identification module 211 identifies the words having a descriptiveness metric of '1' or close to '1' and deems those words as attributes. As discussed above, one or more attributes may be used to meaningfully describe a given location. The attribute identification module 211 identifies, for each location having a listing stored in database 201, a set of attributes that best describe the location. Specifically, for each location, the attribute identification module 211 processes the listings and reviews of listings located in the location and identifies the set of attributes that appear most frequently in the listings and reviews. For example, if the attributes include "skiing," "surfing," "beach," "vistas," "architecture," and "nature," the set of attributes that best San Francisco would likely be "vistas," "architecture," and "nature," while the set of attributes that best describe South Lake Tahoe would be "skiing," "hiking," "vistas," and "nature."

Exemplary Method

Figure 3:
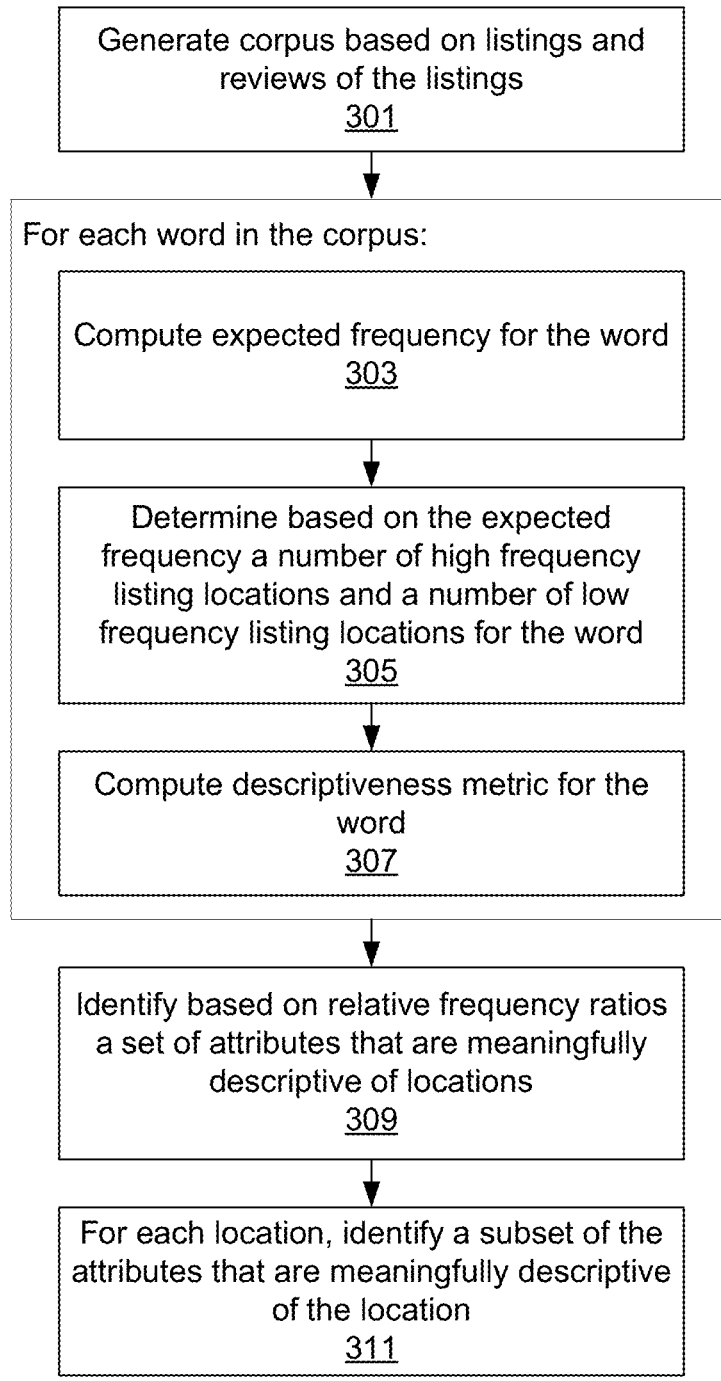
FIG. 3 is a flow chart for processing listings and reviews to identify descriptive attributes for listing locations, according to one embodiment.

FIG. 3 is a flow chart for processing listings and reviews to identify descriptive attributes for listing locations, according to one embodiment. In step 301, the attribute identification module 211 generates a corpus based on listings and reviews of listings stored in the database 201. The subsequent steps 303-307 are performed for each unique word in the corpus. In step 303, the attribute identification module 211 computes the expected frequency for a word. The expected frequency is determined based on the total number of times the word occurs in the corpus and the total number of words in the corpus. In step 305, the attribute identification module 211 determines a number of high frequency listing locations and a number of below expected frequency listing locations. The high frequency listing locations are those locations in which listings and reviews include the word at a higher frequency relative to the expected frequency. The below expected frequency listing locations are those locations in which listings and reviews include the word at a lower frequency relative to the expected frequency. In step 307, the attribute identification module 211 computes the descriptiveness metric for the word as a ratio of the number of high frequency listings locations and the number of below expected frequency listing locations.

In step 309, the attribute identification module 211 identifies the words having a descriptiveness metric equal to or within a threshold range from an attribute reference number and deems those words as attributes. For example, the attribute reference number can be '1' or within a threshold range from '1'. As discussed above, one or more attributes may be used to meaningfully describe a given location. In step 311, the attribute identification module 211 identifies, for each location having a listing stored in database 201, a set of attributes that best describe the location. Specifically, for each location, the attribute identification module 211 processes the listings and reviews of listings located in the location and identifies the set of attributes that appear most frequently in the listings and reviews.

The attribute identification module 211 can receive a request for the attributes of a location. To do this, module 211 identifies the subset of words in the corpus associated with the location, and compares that subset against the list of attributes, resulting in a list of attributes applicable to that location. This comparison may be performed, for example, by simple string comparison. The identified list of attributes are provided in response to the request.

Exemplary Uses of Identified Attributes

The attributes identified as meaningfully describing a particular location may be used in a variety of ways. For example, metadata related to the location may be augmented with the identified attributes. As another example, the attributes may be displayed to users booking listings in the locations or generally browsing listings.

Figure 4A:
FIGS. 4A and 4B illustrate exemplary interfaces that use the attributes identified as meaningfully describing a location.
Figure 4B:
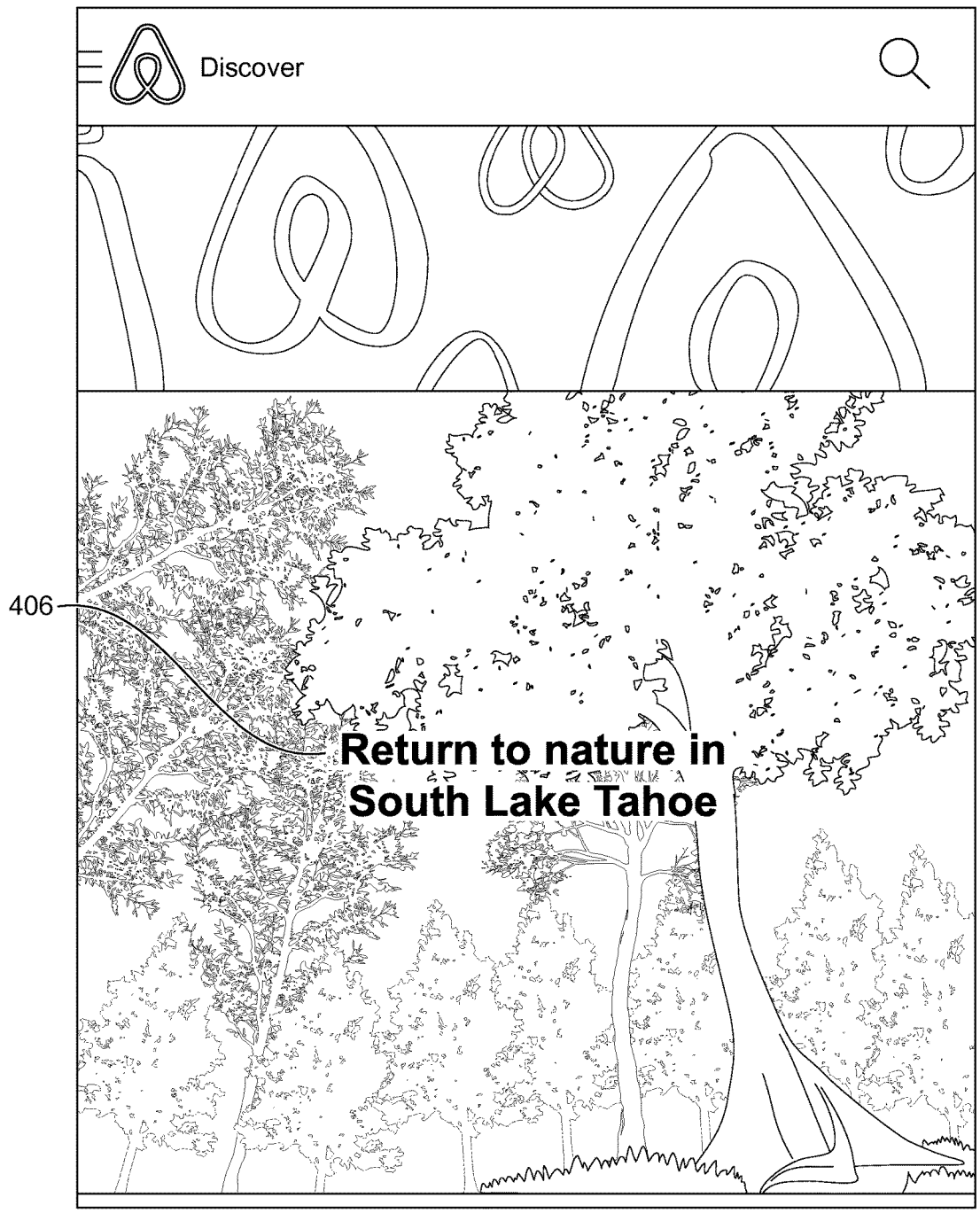

FIGS. 4A and 4B illustrate exemplary interfaces that use the attributes identified as meaningfully describing a location. Specifically, FIG. 4A illustrates user interface tiles associated with different locations. For example, tile 402 is associated with the city Austin. In some cases, the tile associated with a given location includes an attribute of the location. For example, tile 404 associated with Santa Cruz includes the attribute "sun" that is deemed to be descriptive to Santa Cruz. This attribute is identified using the process described above in conjunction with FIGS. 2 and 3. Similarly, FIG. 4B illustrates a discovery user interface that includes a single tile 406 associated with South Lake Tahoe. The tile 406 includes the attribute "nature" that is deemed to be descriptive of South Lake Tahoe. Again, this attribute is identified using the process described above in conjunction with FIGS. 2 and 3.

Additional Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
    retrieving listings and reviews of the listings, each listing associated with one of a plurality of locations;
    extracting one or more words from text of each listing and each review to generate an initial list of words;
    generating a corpus of words from the initial list of words by filtering a subset of words from the initial list of words;
    maintaining, for each location of the plurality of locations, a co-occurrence matrix storing frequencies of co-occurrences of pairs of words appearing in the listings and reviews associated with the location, each frequency of co-occurrences of a pair of words describing a likelihood that the pair of words describe a same attribute;
    for each of the words in the corpus:
        computing an expected frequency for a word to appear in the corpus by computing a ratio of a number of times the word appears in the corpus to a total number of words in the corpus, wherein, in response to a second word in the corpus having at least a threshold level of similarity to the word based on the co-occurrence matrices, a number of times the second word appears in the corpus counts toward the number of times the word appears in the corpus,
        determining, for each location in which the word appears in at least one of a listing or a review, a per-location frequency for the word, the per-location frequency for the word indicating a number of times the word appears in the listings and reviews for the location,
        determining a number of high frequency listing locations for the word, the high frequency listing locations comprising locations where the per-location frequency of the word is at least a first multiple greater than the expected frequency,
        determining a number of below expected frequency listing locations for the word, the below expected frequency listing locations comprising locations where the per-location frequency of the word is at most a second multiple smaller than the expected frequency, and
        determining a descriptiveness metric for the word by calculating a ratio of the number of high frequency listings locations for the word to the number of below expected frequency listings locations for the word;
    identifying, as attributes, words in the corpus of words having a descriptiveness metric within a threshold range of an attribute reference number, the descriptiveness metric measuring the uniqueness of a word to a location; and
    selecting, for a particular location of the plurality of locations, an attribute of the identified attributes based on a frequency of the attribute in listings and reviews of the listings associated with the particular location, wherein the selected attribute represents a characteristic of the particular location.

2. The method of claim 1, wherein filtering the subset of words from the initial list of words comprises:
    filtering stop words from the initial list of words; and
    filtering proper nouns from the initial list of words.

3. The method of claim 1, wherein the per-location frequency based on a total number of times the word occurs in listings associated with the location.

4. The method of claim 1, wherein the descriptiveness metric is a ratio of the number of high frequency listings locations to the number of below expected frequency listings locations.

5. The method of claim 1, wherein the descriptiveness metric is a numerical value that represents how descriptive a word is of a location relative to the other words in the corpus.

6. The method of claim 1, wherein the attribute reference number is 1.

7. The method of claim 1, further comprising:
    identifying bigrams and trigrams in the listings and reviews, each bigram comprising two component words, and each trigram comprising three component words; and
    adding the identified bigrams and trigrams to the corpus of words;
    wherein a number of times a component word of a bigram or trigram appears in an identified bigram or trigram in the corpus of words is not counted towards a number of times the component word appears in the corpus for computing the expected frequency for the component word to appear in the corpus.

8. The method of claim 1, wherein the expected frequency is based on a total number of times the word occurs in the corpus, a total number of times other words semantically similar to the word occur in the corpus, and a total number of words in the corpus.

9. The method of claim 1, further comprising:
receiving a request for attributes of one of the locations;
identifying a subset of the corpus comprising words present in listings and reviews of the listings associated with the location;
comparing the attributes against the subset of words to determine a list of attributes for the location; and
providing the list of attributes for the location in response to the request.

10. The method of claim 9, wherein comparing the attributes against the subset of words to determine the list of attributes for the location comprises:
identifying which of the attributes are present as words in the subset of the corpus.

11. A non-transitory computer readable storage medium comprising instructions that when executed by at least one processor causes the processor to:
retrieve listings and reviews of the listings, each listing associated with one of a plurality of locations;
extract one or more words from text of each listing and each review to generate an initial list of words;
generate a corpus of words from the initial list of words by filtering a subset of words from the initial list of words;
maintain, for each location of the plurality of locations, a co-occurrence matrix storing frequencies of co-occurrences of pairs of words appearing in the listings and reviews associated with the location, each frequency of co-occurrences of a pair of words describing a likelihood that the pair of words describe a same attribute;
for each of the words in the corpus:
compute an expected frequency for a word to appear in the corpus by computing a ratio of a number of times the word appears in the corpus to a total number of words in the corpus, wherein, in response to a second word in the corpus having at least a threshold level of similarity to the word based on the co-occurrence matrices, a number of times the second word appears in the corpus counts toward the number of times the word appears in the corpus,
determine, for each location in which the word appears in at least one of a listing or a review, a per-location frequency for the word, the per-location frequency for the word indicating a number of times the word appears in the listings and reviews for the location,
determine a number of high frequency listing locations for the word, the high frequency listing locations comprising locations where the per-location frequency of the word is at least a first multiple greater than the expected frequency,
determine a number of below expected frequency listing locations for the word, the below expected frequency listing locations comprising locations where the per-location frequency of the word is at most a second multiple smaller than the expected frequency, and
determine a descriptiveness metric for the word by calculating a ratio of the number of high frequency listings locations for the word to the number of below expected frequency listings locations for the word;
identify, as attributes, words in the corpus of words having a descriptiveness metric within a threshold range of an attribute reference number, the descriptiveness metric measuring the uniqueness of a word to a location; and
select, for a particular location of the plurality of locations, an attribute of the identified attributes based on a frequency of the attribute in listings and reviews of the listings associated with the particular location, wherein the selected attribute represents a characteristic of the particular location.

12. The non-transitory computer readable storage medium of claim 11, wherein filtering the subset of words from the initial list of words comprises:
filtering stop words from the initial list of words, and
filtering proper nouns from the initial list of words.

13. The non-transitory computer readable storage medium of claim 11, wherein the per-location frequency based on a total number of times the word occurs in listings associated with the location.

14. The non-transitory computer readable storage medium of claim 11, wherein the descriptiveness metric is a ratio of the number of high frequency listings locations to the number of below expected frequency listings locations.

15. The non-transitory computer readable storage medium of claim 11, wherein the descriptiveness metric is a numerical value that represents how descriptive a word is of a location relative to the other words in the corpus.

16. The non-transitory computer readable storage medium of claim 11, wherein the attribute reference number is 1.

17. The non-transitory computer readable storage medium of claim 11, further comprising: identifying bigrams and trigrams in the listings and reviews, each bigram comprising two component words, and each trigram comprising three component words; and 8 adding the identified bigrams and trigrams to the corpus of words; wherein a number of times a component word of a bigram or trigram appears in an identified bigram or trigram in the corpus of words is not counted towards a number of times the component word appears in the corpus for computing the expected frequency for the component word to appear in the corpus.

18. The non-transitory computer readable storage medium of claim 11, wherein the expected frequency is based on a total number of times the word occurs in the corpus, a total number of times other words semantically similar to the word occur in the corpus, and a total number of words in the corpus.

19. The non-transitory computer readable storage medium of claim 11, further comprising: receiving a request for attributes of one of the locations; identifying a subset of the corpus comprising words present in listings and reviews of the listings associated with the location; comparing the attributes against the subset of words to determine a list of attributes for the location; and providing the list of attributes for the location in response to the request.

20. The non-transitory computer readable storage medium of claim 19, wherein comparing the attributes against the subset of words to determine the list of attributes for the location comprises:
identifying which of the attributes are present as words in the subset of the corpus.

* * * * *